United States Patent [19]

Foran, Jr. et al.

[11] Patent Number: 4,911,010
[45] Date of Patent: Mar. 27, 1990

[54] FLUID FLOWMETER

[75] Inventors: Charles D. Foran, Jr., Richardson, Tex.; William J. LoPresti, Lutz, Fla.

[73] Assignee: Flowdata, Inc., Dallas, Tex.

[21] Appl. No.: 231,684

[22] Filed: Aug. 12, 1988

[51] Int. Cl.⁴ .............................................. G01F 3/10
[52] U.S. Cl. ................................................... 73/261
[58] Field of Search .................... 73/253, 261, 861.87, 73/861.94

[56] References Cited

U.S. PATENT DOCUMENTS

| 294,026 | 2/1884 | Fitts . |
| 386,795 | 7/1888 | Ball . |
| 2,383,226 | 8/1945 | Swindle . |
| 3,255,630 | 6/1966 | Karlby et al. . |
| 3,342,071 | 9/1967 | Meyers .............................. 73/261 |
| 3,413,851 | 12/1968 | Curtiss et al. . |
| 3,554,032 | 1/1971 | Schneider, Jr. .................... 73/253 X |
| 3,695,106 | 10/1972 | Geisow . |
| 3,707,872 | 1/1973 | Masson et al. . |
| 3,811,323 | 5/1974 | Swenson . |
| 3,858,448 | 7/1975 | Evans et al. . |
| 4,007,635 | 2/1977 | Friebel .............................. 73/253 X |
| 4,023,410 | 5/1977 | Althaus ............................ 73/861.87 |
| 4,210,410 | 7/1980 | Ohtani . |
| 4,224,015 | 9/1980 | Nagata . |
| 4,295,369 | 10/1981 | Wendelboe . |
| 4,329,130 | 5/1982 | Nagata et al. . |
| 4,345,480 | 8/1982 | Basham et al. . |
| 4,409,829 | 10/1983 | Weber . |
| 4,451,207 | 5/1984 | Hoffmann . |
| 4,489,615 | 12/1984 | Ward . |
| 4,579,008 | 4/1986 | Bohm et al. . |
| 4,641,522 | 2/1987 | Lopresti . |

FOREIGN PATENT DOCUMENTS

| 0031317 | 12/1980 | European Pat. Off. . |
| 2830563 | 1/1980 | Fed. Rep. of Germany . |
| 55-87914 | 7/1980 | Japan . |
| 55-90819 | 9/1980 | Japan . |
| 0073624 | 5/1982 | Japan .......................... 73/261 |
| 58-184514 | 10/1983 | Japan . |

Primary Examiner—Herbert Goldstein
Attorney, Agent, or Firm—James Creighton Wray

[57] ABSTRACT

A fluid volumetric flowmeter has a casing forming a chamber, a fluid inlet, and a fluid outlet communicating with the chamber. Two rotors positioned within the chamber have intermeshing lobes and valleys for turning in the chamber as fluid flows from the inlet through the chamber to the outlet. At least one of the rotors has a facial recess for receiving a magnet. A shaft mount is connected to a wall of the casing. A response shaft is rotationally mounted in the shaft mount. An indicator connected to the shaft rotates with the shaft. A first magnetic coupling is mounted in the rotor recess of the rotor. A second magnetic coupling is mounted on the shaft near the first magnetic coupling for rotating the second magnetic coupling, the shaft, and the indicator in response to rotation of the rotors.

19 Claims, 3 Drawing Sheets

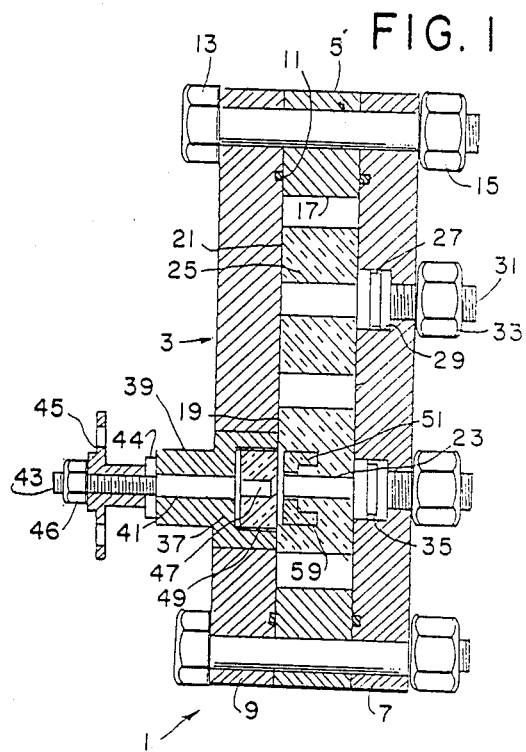

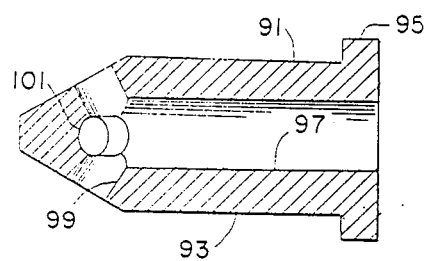
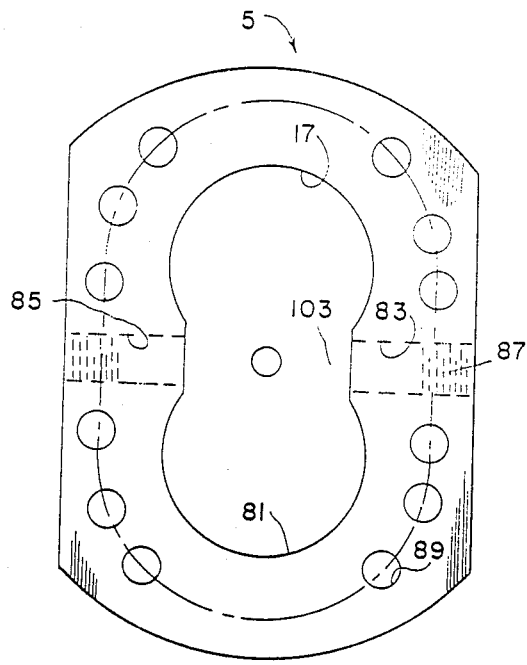
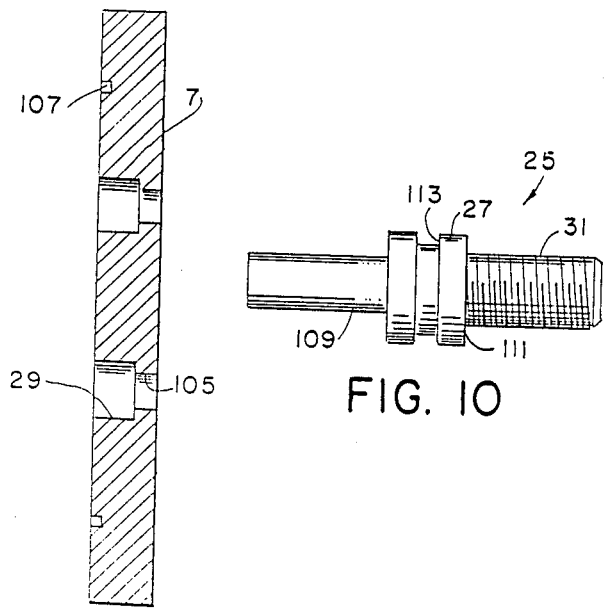
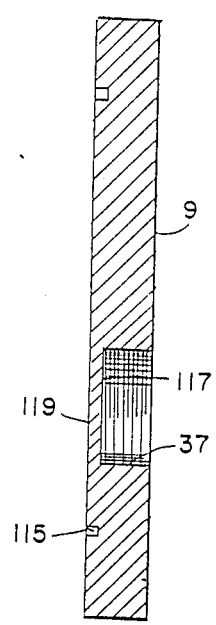
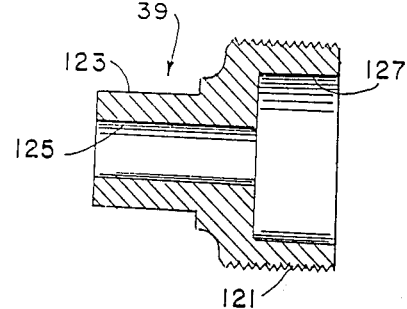

FIG. 13
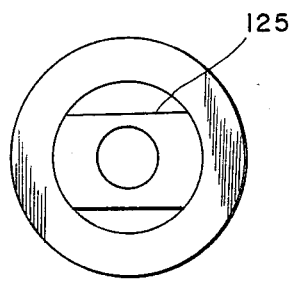
FIG. 14
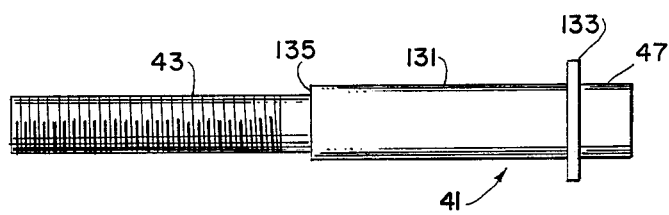
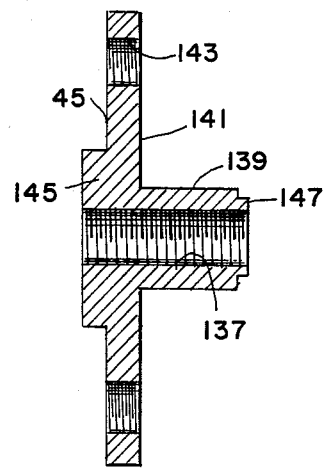
FIG. 15
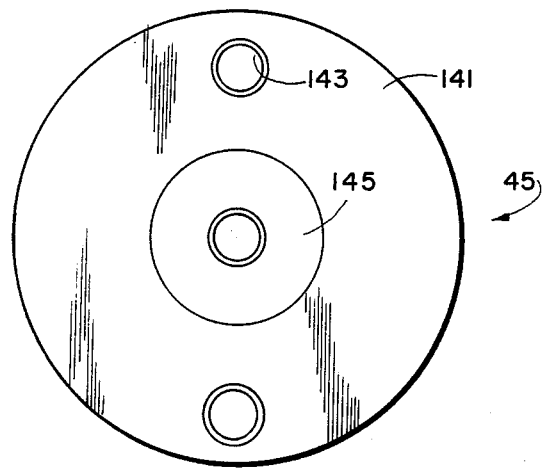
FIG. 16

FLUID FLOWMETER

BACKGROUND OF THE INVENTION

Well known fluid flowmeters use paired rotors on parallel shafts within intersecting cylindrical chambers. Fluid flows into the chamber, turns the rotors, and exits the chamber. The number of turns of the rotors is measured to indicate the amount of fluid flow. Perhaps the best known types of flowmeters with paired rotors are water meters.

One problem generally associated with the meters is the accuracy in reading. Often readings are taken by extending shafts, on which the rotors are mounted, through the walls of the chambers and the mounting gears on the extended shafts to turn meters. In many cases that is satisfactory.

In meters which require high accuracy the extended shafts may not be useful, and other forms of measuring become important. Some forms of measurement have used sensors on the outside of a chamber to sense movement of lobes within the chamber. Some of those forms use magnets embedded in the lobes within the chamber and sensors outside of the chamber to sense the passage of magnets. Other devices have used magnetic couplings between shafts turning on bearings within the chamber and shafts outside of the chamber.

Difficulty in magnetic coupling and in conforming indicator load to available torque produced by the rotors within the chamber has produced varied success. The problem is intensified when using the meters with fluids which are inimicable to the use of bearings, viscous fluids, varied fluids or fluids which require periodic cleaning of the meters.

An example of such a fluid is automotive paint.

In the course of painting automobiles it is important to precisely control the amount of paint being applied to the automobile and to coordinate the amount of paint being applied with the relationship of the applicators to the automobile body.

Paint lines and meters must be periodically cleaned with solvents having viscosities greatly differing from the paint. While it is not necessary to precisely measure the solvents, it is extremely important that all of the paint be taken from the meter and all of the solvents be removed from the meter. Consequently, it is highly desirable to use meters without bearings and ones which are easily and effectively cleaned.

The present invention is directed to the provision of such meters with highly accurate internal flow characteristics and highly accurate external measuring systems.

SUMMARY OF THE INVENTION

A fluid volumetric flowmeter has a casing forming a chamber, a fluid inlet, and a fluid outlet communicating with the chamber. Two rotors positioned within the chamber have intermeshing lobes and valleys for turning in the chamber as fluid flows from the inlet through the chamber to the outlet. At least one of the rotors has a facial recess for receiving a magnet. A shaft mount is connected to a wall of the casing. A response shaft is rotationally mounted in the shaft mount. An indicator connected to the shaft rotates with the shaft. A first magnetic coupling is mounted in the rotor recess of the rotor. A second magnetic coupling is mounted on the shaft near the first magnetic coupling for rotating the second magnetic coupling, the shaft, and the indicator in response to rotation of the rotors.

Preferably, shaft mount is mounted in a recess in the wall of the casing.

In a preferred embodiment, the shaft mount has a recess, in which the second magnetic coupling is positioned.

Preferably, the recess in the shaft mount faces the recess in the rotor.

In one preferred embodiment the shaft extends from the shaft mount, and the indicator is mounted on the extended portion of the shaft.

In a preferred construction the casing has a central chamber forming sections with two joined circular chamber portions. The preferred casing has a rear cover and a front cover and bolts for connecting the rear cover, the front cover and the chamber forming portion. Preferably, the shaft is mounted on the front cover.

In a preferred form the second magnetic coupling is mounted within a recess in the front cover.

A preferred front cover is a flat plate having a recess extending inward from an outer surface of the plate. The shaft mount is partially positioned in the recess, and the shaft mount has a recess facing in the direction of the recess in the rotor. The second magnetic coupling is mounted in the recess in the shaft mount.

A preferred indicator shaft has a central bearing portion, a proximal magnetic coupling portion and a distal indicator mounting portion.

In the preferred meter, the central bearing portion is held in the shaft mount, which extends from the wall of the casing. The magnetic coupling portion is held within the wall of the casing, and the indicator portion is positioned outward from the wall of the casing.

Preferably, the first magnetic coupling element is fixed within the rotor recess for rotating with the rotor, and the second magnetic coupling element is fixed on the shaft for rotating with the shaft.

In preferred embodiments the rotors are mounted on stub shafts which extend inward from fixed positions in a wall opposite the wall on which the indicator shaft mount is positioned.

The preferred meters have nozzles extending from the inlet and outlet into the chamber between non-meshing portions of the rotors. Openings in the nozzles pass fluids in directions other than directly between the inlet and outlet.

A preferred fluid flow measuring method flows fluid into a chamber, flows fluid out of a chamber, and rotates rotors within the chamber, while intermeshing lobes and valleys on the rotor. A first magnetic coupling is rotated with one of the rotors. An indicator shaft is mounted on an external wall of the chamber, and a second magnetic coupling is mounted on an end of the indicator shaft nearest to the first coupling on the rotor. The meter rotates the indictor shaft with the second magnetic coupling as the rotor and first magnetic coupling rotate, thereby rotating an indicator connected to a distal end of the indicator.

The measuring method supports the indicator shaft medially, mounts the second coupling on a proximal end of the shaft and mounts the indicator on a distal end of the shaft.

The preferred measuring method mounts the magnetic coupling on the proximal end of the indicator shaft before inserting the indicator shaft in the support bushing and positions the second magnetic coupling in a recess in the support bushing when positioning the indicator shaft in the support bushing before mounting the indicator on a distal end of the shaft.

Preferably, the measuring method mounts the support bushing in a recess of a cover plate and positions the second magnetic coupling in both recesses in spaced axial alignment with the first magnetic coupling.

The preferred method includes flowing fluid out of an inlet through a nozzle extending into the chamber between non-meshing portions of the rotor lobes, flowing fluid out of the chamber into a nozzle extended between non-meshing portions of rotor lobes, and flowing fluid out throughout the second nozzle to the outlet.

Preferably, indications are read from an indicator attached to the indicator shaft.

These and further and other objects and features of the invention are apparent in the disclosure which includes the specification with the above and ongoing description, the claims, and the drawings.

BRIEF DESCRIPTION OF THE DRAWINGS

FIG. 1 is a sectional view of a preferred meter showing a magnetic coupling.

FIG. 2 is a side elevation of the meter shown in FIG. 1.

FIG. 3 is a sectional elevation of a preferred magnetic coupling.

FIG. 4 is a perspective view of the preferred magnetic coupling.

FIG. 5 is a cross sectional elevation of a rotor in which the first magnetic coupling is mounted. The other rotor is identical except that the recessed area at the left of the rotor is replaced by a solid portion having an extended bore.

FIG. 6 is an elevational plan of the preferred rotor shown in FIG. 5.

FIG. 7 is an elevational detail of the middle portion of the casing.

FIG. 8 is a cross sectional detail of the preferred nozzle.

FIG. 9 is a cross sectional elevation of a preferred rear cover.

FIG. 10 is a detail of a rotor shaft which is mountable on the rear cover shown in FIG. 9.

FIG. 11 is an elevational cross section of a front cover.

FIG. 12 is a cross sectional detail of an indicator spindle mounting bushing for mounting the recess in the front cover.

FIG. 13 is an end elevation of the bushing of FIG. 12.

FIG. 14 is an elevational detail of the indicator spindle.

FIG. 15 is a cross sectional elevation of an indicator target hub for mounting on the indicator spindle.

FIG. 16 is an elevation detail of the indicator hub.

DETAILED DESCRIPTION OF THE DRAWINGS

Referring to FIG. 1 a preferred flowmeter is generally indicating by the number 1. The flowmeter has a casing 3 which includes a central portion 5, a rear cover 7, and a front cover 9. O-ring seals 11 are placed between the sections, and the sections are held together with bolts 13 and nuts 15, thereby forming a chamber 17. Rotors 19 and 21 are positioned on stub shafts 23 and 25, which have mounting portions 27 positioned in recesses 29 in the rear cover 7. Threaded portions 31 of the shaft extend through the rear cover, and nuts 33 are secured to the threaded portions, holding the shafts assembled. O-ring seals 35 seal the recesses 29.

The front cover 9 has a threaded recess 37, into which spindle support bushing 39 is threaded. An indicator spindle 41 is supported in bushing 39. An outer end 43 of the spindle supports an indicator mounting hub 45. A friction reducing bushing 44 is placed on the shaft between the spindle support bushing 39 and the rotating indicator hub 45.

An inner end 47 of the shaft has fixed thereto a secondary coupling magnet 49 which turns the shaft in response to rotation of the primary coupling magnet 51. The magnets are separated by a portion of the front cover at the base of the recess 37 and by close spacing of the magnets within their recesses.

FIG. 2 shows a front elevational view of the flowmeter 1 with the front cover 9, the connecting bolts 13, and the indicator hub 45 mounted on the distal end 43 of the indicator spindle.

FIG. 3 shows a cross section of a magnet 50 which is identical to the magnets 49 and 51. Magnet 50 is preferably a sintered Alnico 2 magnet which weights less than 0.01 of a pound. The magnet has a cylindrical body 53 with a bore 54. Pole pieces 55 and 56 extend from the cylindrical portion 53 of the magnet. In preferred installations the pole pieces face each other from the magnets. The primary coupling magnet 51 mounted on the rotor 19 has its outer cylindrical surface 57 tightly wedged in the recess 59 of the rotor 19. The secondary coupling magnet 49 has its central bore 54 tightly fitted on the proximal end 47 of the indicator spindle.

Referring to FIG. 5, rotor 19 has a generally cylindrical central shape and has radially extending lobes 61 and valleys 63 about its, outer periphery. The frontal face 65 of the magnet is recessed 67 so that only an extended hub portion 69 bears against the front wall of the chamber, which is the inner wall of the cover, providing a clearance 71.

A similar recessed portion 67 of the front face 65 is provided on the upper rotor 21 to provide a similar clearance 71 between the rotor and the front cover. Bores 73 extend through the rotors to loosely receive the mounting shafts 23 and 25. The bore 73 extends entirely through the upper rotor. The lower rotor is provided with a recess 59 which is provided with an inner cylindrical portion 75 and outer portion 77. The cylindrical portion 53 of the magnet is positioned within the cylindrical portion 75 of the recess.

As shown in FIG. 6, lobes 61 have generally cylindrical tips 79, and the valleys 63 are generally cylindrical concave valleys having greater radii than the cylindrically curved tips 79. The radii of the tips 79 are located on a circle around a center of the rotor outward from a circle around the center of the rotor on which the larger radii of the valleys 63 are centered. The rotors are configured so that a boundary layer clearance exists between the tips and valleys when they intermesh during usage.

The thickness of the rotors, the overall dimensions of the rotors and the relationship between the rotors and stub shafts provide small clearance commensurate with free operation and with accurate measuring of the fluids.

As shown in FIG. 7, the central section 5 of the housing has a chamber 17 which is formed from two overlapping cylindrical portions 81. An inlet 83 and an outlet 85 are provided to open between the cylindrical sections. The inlet and outlet are threaded 87 to receive nozzles as later will be described. Holes 89 extend through all of the sections to receive the joining bolts 13.

Nozzles 91 shown in FIG. 8 have a threaded cylindrical portion 93 for threading into threads 87 in the inlet and outlet. A cap portion 95 abuts a flat outer surface of the central section. Bore 97 terminates inwardly in four spaced openings 99 in the sloped inner surface 101 of the nozzle to flow fluid in directions other than directly between nozzles. The sloped inner surface 101 slopes between the non-intermeshing portions of the rotor lobes in an area generally indicated as 103 in FIG. 7 to substantially fill the large void spaces in the center of the chamber. The nozzle has two purposes: to redirect flow and to fill void spaces within the chamber.

FIG. 9 shows a cross sectional elevation of a rear cover 7. Rear cover 7 has recesses 29 which receive the mounting portions of the stub shafts and has bores 105 which receive the threaded portions of the stub shafts. The continuous groove 107 receives an O-ring seal 11 as shown in FIG. 1.

A stub shaft 25 shown in FIG. 10 has a bearing portion 109 which extends through bore 23 in a rotor. A mounting portion 111 fits within recess 29 in the rear cover 7, and groove 113 receives an O-ring seal to seal the recess 29. Threaded portion 31 extends through the bore in the cover to receive a nut 33 as shown in FIG. 1.

As shown FIG. 11 the front cover 9 has a threaded recess 37 which receives the indicator spindle mounting bushing. A continuous groove 115 receives an O-ring seal 11 which forms a seal between the front cover 9 and the central section 5. Recess 37 has a base 117 which is approximately 0.050 inch from the inner surface 119 of the front cover.

An indicator spindle mounting bushing 39 is shown in FIG. 12. The bushing has a threaded portion 121 which is received in the threaded recess 37 in front cover, and has an extended portion 123 with flats 125 which are used to turn the bushing into the front cover recess 37. The bushing 39 has a central bearing bore 126, which receives a bearing portion of the spindle shaft, and has a recess 127 which receives a magnetic coupling mounted on the spindle shaft. As shown in FIG. 1 the portion 123 of the spindle bushing extends forward from the front cover 9.

The indicator spindle shaft 41 is shown in FIG. 14. The shaft 41 has a central bearing portion 131 and a magnetic coupling portion 47 and a collar 133 therebetween. A distal portion 43 of spindle 41 is threaded to receive an indicator hub 45 and locking nut 46 as shown in FIG. 1. The anti-friction bushing 44 shown in FIG. 1 rests against the step 135 shown in FIG. 14. The indicator target hub 45 shown in FIG. 15 has a threaded bore 137 which is received on threaded portion 43 of the indicator spindle 41. A central portion 139 extends along the indicator spindle and a flat edge 141 has threaded holes 143 for receiving a target such as a optical reflector. A flat portion 145 of the hub receives a flat portion of the nut 6 shown in FIG. 1 to lock the hub on the spindle. The friction reducing bushing 44 shown in FIG. 1 rests against the step portion 147 of the hub.

The fluid flowmeter is assembled by placing O-rings 27 in the recess 113 of the stub shaft mounting portion 111, and the mounting portions 111 are pushed into the recesses 29 in the rear cover 7. Nuts 33 are threaded on extensions 31 of the shafts and are tightened to secure the stub shafts in the rear cover. The first magnetic coupling is pressed into rotor 19 and rotors 19 and 21 are assembled on the stub shafts.

The central section 5 is placed over the rotors and the front cover 9 is placed on the central section 5. Through openings are aligned, and bolts 13 are inserted in the openings and nuts 15 are secured. Nozzles are inserted in the inlet and outlet and are tightened in place, completing the chamber construction.

The second magnetic coupling is pressed on the end of the spindle shaft and the spindle shaft is inserted through the spindle bushing. The friction reducing bushing 44 is added on the end of the spindle shaft, and the indicator target hub 45 is threaded onto the end of the spindle shaft and locked thereon with nut 46. The bushing 39 is threaded into the recess, and the front cover and the meter is ready for use. In use, fluid flows through a nozzle into the chamber and flows outward and around the periphery of the chambers, turning the rotors, and flows outward through the outlet nozzle and through the outlet. As the rotors turn, the first magnetic coupling turns, forcing the second magnetic coupling and the spindle shaft to turn, turning the indicator hub and an indicator mounted thereon. The indicator on the hub is read, such as by retro-reflective optical readers.

While the invention has been described with reference to specific embodiments, modifications, and variations may be constructed without departing from the scope of the invention which is defined in the following claims.

We claim:

1. A fluid meter comprising a casing having a chamber and a fluid inlet and a fluid outlet communicating with the chamber; two rotors are positioned within the chamber and have intermeshing lobes and valleys for turning in the chamber as fluid flows from the inlet through the chamber and out through the outlet; at least one of the rotors has a facial recess for receiving magnetic means; a shaft mounting means mounted within a wall of the casing; a response shaft rotationally mounted in the shaft mounting means, an indicator support connected to the shaft for rotating with the shaft; a first magnetic coupling mounted in the recess of the rotor, and a second magnetic coupling means mounted on the shaft near the first magnetic coupling for rotating the second magnetic coupling, the shaft and the indicator support in response to rotation of the rotors.

2. The meter of claim 1 wherein the shaft mounting means is mounted in a recess in the wall of the casing.

3. The apparatus of claim 2 wherein the shaft mounting means has a recess in which the second magnetic coupling element is positioned.

4. The meter of claim 3 wherein the recess in the shaft mounting means faces the recess in the rotor.

5. The meter of claim 4 wherein the shaft extends from the shaft mounting means, and wherein the indicator support is mounted on the extended portion of the shaft.

6. The meter of claim 1 wherein the casing has a central chamber forming section with two joined circular chamber portions and wherein the casing has a rear cover and a front cover and means for connecting the rear cover, the front cover and the chamber forming portion, and wherein the shaft mounting means is mounted on the front cover.

7. The meter of claim 6 wherein the front cover has a recess and wherein the second magnetic coupling is mounted within the recess in the front cover.

8. The meter of claim 6 wherein the front cover comprises a flat plate having a recess extending inward from an outer surface of the plate, and wherein the shaft mounting means is positioned in the recess, and wherein the shaft mounting means has a recess facing in the direction of the recess in the rotor and wherein the second magnetic coupling is mounted in the recess in the shaft mounting means.

9. The means of claim 1 wherein the shaft has a central bearing portion, a proximal magnetic coupling portion and a distal indicator mounting portion.

10. The meter of claim 9 wherein the central bearing portion is held in the shaft mounting means which extends from the wall of the casing and wherein the magnetic coupling mounting portion is held within the wall of the casing and wherein the indicator holding portion is positioned outward from the wall of the casing.

11. The meter of claim 1 wherein the first magnetic coupling is fixed within the rotor recess for rotating with the rotor, and wherein the second magnetic coupling is fixed on the shaft for rotating with the shaft.

12. The meter of claim 11 wherein the rotors are mounted on stub shafts which extend inward from fixed positions in a wall opposite the wall on which the indicator shaft mounting means is positioned.

13. The meter of claim 1 further comprising nozzles extending from the inlet and outlet into the chamber between non-meshing portions of the rotors, the nozzles having openings for flowing fluids in directions other than directly between the inlet and outlet.

14. The fluid flow measuring method comprising the following steps:
flowing fluid into a chamber through the chamber and out of the chamber, and rotating rotors within the chamber with the fluid flow and intermeshing lobes and valleys on the rotors as they rotate, rotating a first magnetic coupling with one of the rotors, inserting an indicator shaft in an external wall of the chamber, supporting the indicator shaft medially in a support bushing, and mounting a second magnetic coupling on an end of the indicator shaft nearest the first coupling on the rotor, rotating the indicator shaft with the second magnetic coupling as the rotor and first magnetic coupling rotate, and rotating an indicator support connected to a distal end of the shaft.

15. The measuring method of claim 14 further comprising mounting the second coupling on a proximal end of the shaft and mounting the indicator support on a distal end of the shaft.

16. The measuring method of claim 14, further comprising the steps of mounting the second magnetic coupling on the proximal end of the indicator shaft, inserting the indicator shaft in the support bushing, positioning the second magnetic coupling in a recess in the support bushing when inserting the indicator shaft in the support bushing, and mounting the indicator support on the distal end of the shaft.

17. The measuring method of claim 16 further comprising mounting the support bushing in a recess of a cover plate and positioning the second magnetic coupling in spaced axial alignment with the first magnetic coupling.

18. The method of claim 14 further comprising flowing fluid out of the inlet through a first nozzle extending into the chamber between non-meshing portions of the rotor lobes and flowing fluid out of the chamber through a second nozzle extending into the chamber between non-meshing portions of rotor lobes and flowing fluid out of the second nozzle through the outlet.

19. The method of claim 14 further comprising reading indications from an indicator attached to the indicator support.

* * * * *